United States Patent [19]

Fort

[11] 3,898,387

[45] Aug. 5, 1975

[54] DIGITAL DATA SWITCHING SYSTEM UTILIZING VOICE ENCODING AND DECODING CIRCUITRY

[76] Inventor: Charles P. Fort, P.O. Box 38547, Dallas, Tex. 75238

[22] Filed: Aug. 21, 1973

[21] Appl. No.: 390,327

[52] U.S. Cl. ........................ 179/15 BM; 179/15 BY

[51] Int. Cl. ................................................ H04j 3/12

[58] Field of Search...... 179/15 BA, 15 BY, 15 BM, 179/15 AW

[56] References Cited

UNITED STATES PATENTS

| | | | |
|---|---|---|---|
| 3,657,486 | 7/1970 | Gara | 179/15 AW |
| 3,748,376 | 7/1973 | Parker | 179/15 AW |

*Primary Examiner*—Ralph D. Blakeslee
*Attorney, Agent, or Firm*—Richards, Harris & Medlock

[57] ABSTRACT

The specification discloses a system for transmitting analog signal information via telephone lines which includes an encoding station for converting the analog signal information into a series of pulses spaced apart by periods proportional to the magnitude of the analog signals. The encoding station transmits digital dialing data and the series of pulses via a telephone line to a central switching station which is operable to switch the data and pulses between a plurality of telephone lines. Decoding circuitry associated with a plurality of transmitting telephone lines operates to produce addresses corresponding to telephone lines presenting information to be switched. Contention circuitry operates to resolve simultaneous information presentation to the system. A random access memory is associated with the decoding circuitry. Circuitry is responsive to dialing data in order to store the identity address of the receiving telephone line in the random access memory. Accessing circuitry is responsive to a pulse transition for causing the memory to generate an address code. Decoding circuitry is responsive to the output of the memory for selection of the receiving telephone line. Circuitry is responsive to the output of the decoding circuitry for transmitting a representation of the pulse transition to the desired receiving telephone line and to a remote station. A decoding circuit is located at the remote station for converting the series of pulses into representation of the original analog signal information.

31 Claims, 43 Drawing Figures

DIGITAL DATA SWITCHING SYSTEM UTILIZING VOICE ENCODING AND DECODING CIRCUITRY

FIELD OF THE INVENTION

This invention relates to the transmission and switching of digital data, and more particularly relates to a system for converting an analog signal into digital information, for transmitting the digital information over a conventional telephone line, for switching the digital information to a desired remote location, and for converting the digital information into the original analog signal.

THE PRIOR ART

A number of techniques have heretofore been developed for converting analog signals into digital pulses and vice versa. Such conversion has previously been accomplished by relatively complex circuitry, the expense of which has tended to prohibit the widespread practical use thereof. In addition, such previously developed conversion systems have often not been able to faithfully reproduce the original analog signal from the encoded digital information. A need has thus arisen for a simple and inexpensive technique for converting analog information into digital signals, such that the digital signals may be transmitted via conventional telephone lines and subsequently accurately converted at a remote station to the original analog information.

A number of highly complex systems have also been previously developed for switching digital information from a calling telephone line to a called telephone line. In many such previously developed telephone switching systems, each input line to the system is allotted a fixed time interval during which it is sampled to see if information is appearing on the line. Thus, a substantial amount of use time of the switching system is wasted when information does not appear on a line during its sampling period. In addition, many of such previously developed telepphone switching systems have passed full digital pulses during switching operations, thus tieing up the switching facilities during the duration of each pulse. A need has thus arisen for a telephone switching system which provides switching functions only upon demand when information appears upon an incoming line, and also for a telephone switching system which provides switching operation to a transition portion of the digital pulse, such that the switching facilities are not tied up for the total duration of the pulse.

SUMMARY OF THE INVENTION

In accordance with the present invention, a system is provided for transmitting analog signal information via a telephone line which includes circuitry for converting the analog signals into digital pulses having time durations proportional to the amplitude of the analog signal. Circuitry transmits the series of pulses via a telephone line and a system at a remote station receives the series of pulses and converts the series of pulses into an accurate representation of the analog signals.

In accordance with another aspect of the invention, circuitry is provided to convert analog signals into pulses having time durations proportional to the amplitude of the analog signals and for transmitting the pulses via a telephone line to a remote station. Circuitry at the remote station receives the pulses and reconstructs the analog signal information. The reconstruction circuitry includes a constant duration monostable multivibrator responsive to the received pulses, a first capacitor connected at one terminal to receive the multivibrator output, and a resistor and a second capacitor connected across the first capacitor. A speaker is connected across the second capacitor for broadcasting the analog signal information.

In accordance with another aspect of the invention, a data line digital switching system includes circuitry for receiving a plurality of data lines. Circuitry is common to each of the data lines and is responsive to digital dialing signals on any one of the data lines in order to store address data. Circuitry common to each of the data lines is responsive to a pulse transition on a transmitting data line for accessing the stored address data and for transmitting a representation of the pulse transition to a receiving data line.

In accordance with a more specific aspect of the invention, a system is provided for switching digital signals transmitted via a telephone line which include terminals connected to a plurality of incoming and outgoing telephone lines. Accessing circuitry is associated with the incoming telephone lines. A memory is provided to be connected to the accessing circuitry. Circuitry is responsive to dialing signals on one telephone line for storing address data in the memory and responsive to a pulse transition for activating the accessing circuitry to cause said memory to generate an address code representative of a desired outgoing telephone line. Decoder circuitry is connected to the output of the memory and is operable to transmit a representation of the pulse transition to the desired outgoing telephone line.

DESCRIPTION OF THE DRAWINGS

For a more complete understanding and for other objects and advantages thereof, reference is now made to the following description, taken in conjunction with the accompanying drawings, in which.

DESCRIPTION OF THE PREFERRED EMBODIMENT

Figure 1:
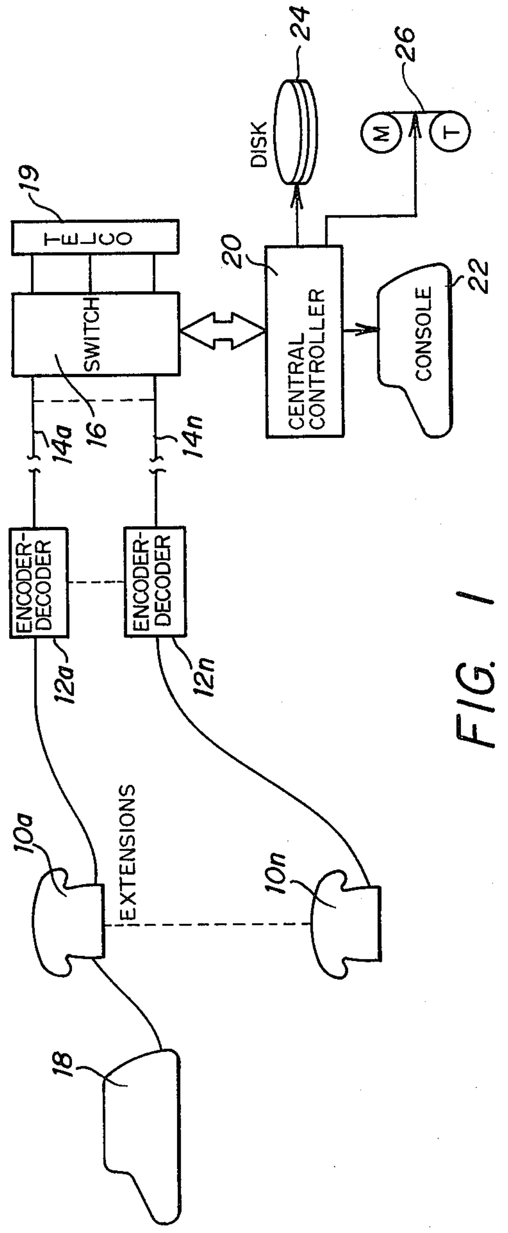
FIG. 1 illustrates an overall block diagram of the present invention.

FIG. 1 illustrates a block diagram of the preferred embodiment of the present system. Although the system is described as a telephone switching system, the present concept may be utilized to switch any type of data lines. While it will be understood that the system can be configured to provide switching between any required number of telephone lines, in the preferred embodiment a system providing selective switching between 240 incoming and outgoing telephone lines will be described. The present switching system is particularly useful for private switching of multiple data lines in multiple tenant office buildings, hospitals, banks, retail stores and the like.

Referring specifically to FIG. 1, a plurality of telephone extension handsets 10*a–n* are interconnected to encoder-decoder systems 12*a–n* and through conventional telephone lines 14*a–n* to the switching system 16 of the invention. A terminal 18 may be connected to any of the telephone extensions in order to provide digital information input and output capability to the system. The switch system 16 is interconnected with the telephone company 19 and is controlled by a central controller 20 having an auxiliary console 22 and disk 24 and tape storage 26. The central controller 20 operates the switch 16 in order to selectively switch connections from incoming telephone lines to outgoing telephone lines to enable data exchange between any pair of the telephone handsets 10*a–n* connected to the system.

Figure 2:
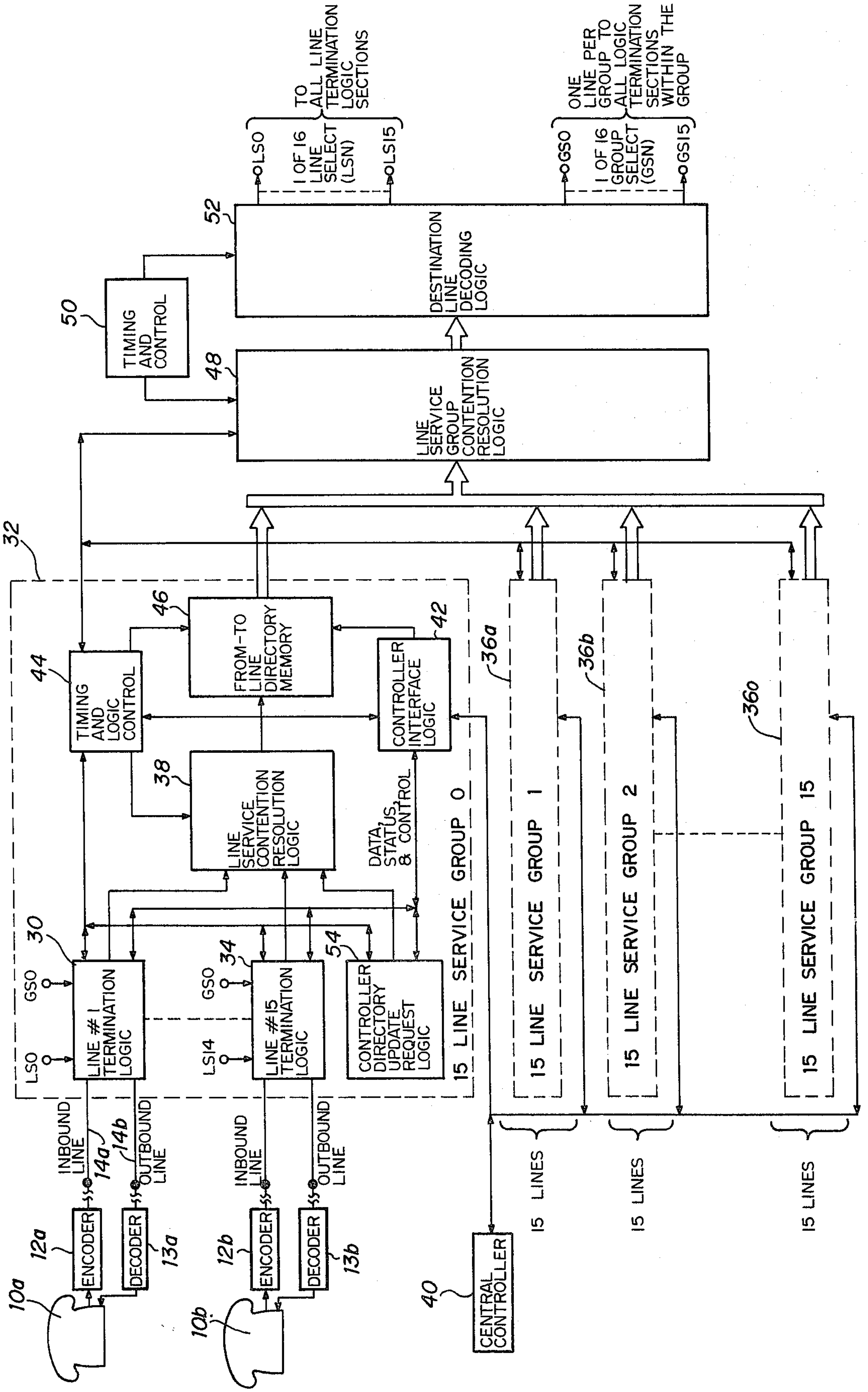
FIG. 2 illustrates a block diagram of the switching station of the invention.

FIG. 2 illustrates a block diagram of the switching station of the invention. As previously indicated, 240 inbound and outbound telephone lines are interconnected to the system. For simplicity of illustration, only a single channel of the switching system will be described in detail in FIG. 2 and in succeeding figures. Referring to FIG. 2, telephone instrument 10*a* is connected through an encoder 12*a* and through an inbound telephone line 14*a* to a line No. 1 termination logic 30. Instrument 10*a* is also connected through a decoder 13*a* and an outbound telephone line 14*b* to logic 30. As may be seen, the line service group zero, indicated by the dotted line 32, includes 15 termination logic circuits. Numbers 2–14 termination logic circuits are omitted for clarity of illustration, but each of the termination logic circuits includes an inbound and an outbound telephone line termination. For example, line No. 15 termination logic 34 is connected through an encoder 12*b* and decoder 13*b* to telephone instrument 10*b*.

As will be subsequently described, the present system may select any one of the fifteen termination logic circuits within the line service group zero by specifying a particular combination of line select (LSN) and group select (GSN) signals. For example, the line No. 1 termination logic circuit 30 may be selected by LSO and GSO signals applied thereto. The line No. 15 termination logic 34 may be selected by the LS14 and GSO signals. In addition to the line service group zero, the system includes fifteen additional line service groups 36*a–o*. Each of the line service groups 36*a–o* are identical to the line service group zero and each includes 15 sets of outbound and inbound telephone lines. The present circuit thus provides switching between 16 groups of fifteen pairs of inbound and outbound telephone lines.

The output of each of the line termination logic circuits is applied to a line service contention resolution logic 38 which provides priority according to predetermined criteria in case of input data appearing simultaneously at multiple inputs. Timing and switching instructions are generated from a central controller 40 and are applied to a controller interface logic circuit 42 which controls the timing and logic control 44. The timing and logic control 44 provides timing and control functions to all phases of the system. The output of the line service contention resolution logic is applied to a from-to line directory memory 46 which applies an input to a line service group contention resolution logic 48. Logic 48 designates which of the line service groups is to be serviced. Timing and control circuitry 50 controls the operation of logic 48 and of the destination line decoding logic 52. Logic 52 receives the output from logic 48 and generates one out of a possible fifteen line select (LSN) signals which are applied to the selected line termination logic. The decoding logic also generates one of 16 possible group select signals (GSN) which is applied to the selected service group such that only one out of the 240 possible termination logics is casused to output a pulse transition. A controller directory update request logic 54 is provided in each of the line service groups to enable continuous updating of the stored address.

Figure 3:
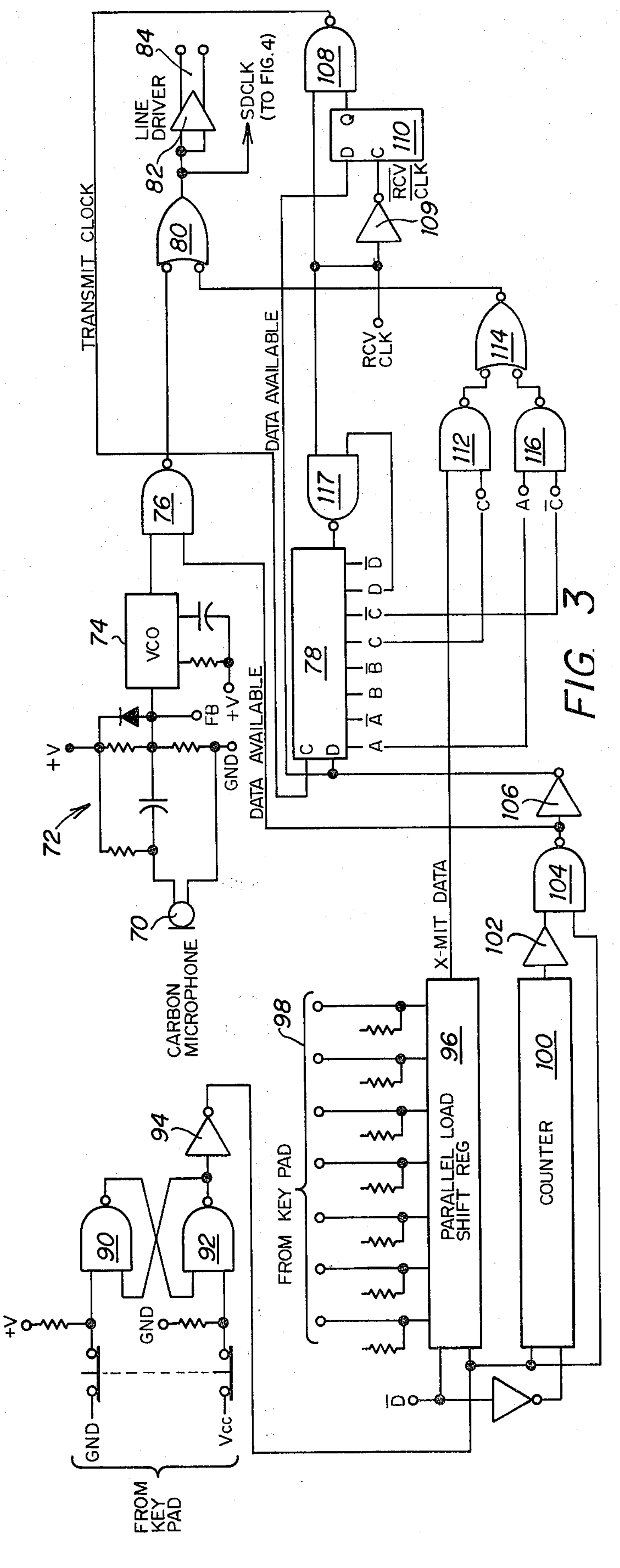
FIG. 3 is a schematic diagram of the encoding circuit.

An important aspect of the present invention is the encoding and decoding of analog or audio data applied through a telephone handset to the present system. FIG. 3 illustrates the encoding circuitry which receives voice data and converts the voice data into digital information which may be transmitted over conventional telephone lines as a pulse train. Voice data is applied through a carbon microphone 70 and is applied through an R-C network 72 to an input of a voltage controlled oscillator (VCO) 74. The output of the VCO is a squarewave having pulse widths proportional to the output voltage from the microphone 70. This squarewave is applied to an input of a NAND gate 76. Gate 76 is enabled by the output from a gate 104. As will be subsequently described, gate 104 disables gate 76 in case data is being transmitted by the system rather than voice information. The output of gate 76 is applied to an input of a NOR gate 80 and is applied through a line driver 82 and line 84 to enable transmission of the data to the central switching station.

If it is desired to transmit binary digital data, as from an input terminal having a keyboard or the like, a key on the keyboard is depressed and contacts are closed to input voltages to the input of NAND gates 90 and 92 which comprise a contact bounce eliminator circuit. The output of gates 90 and 92 is applied through a driver 94 to provide a load pulse which is routed to a parallel load shift register 96. The load pulse causes register 96 to be loaded with inputs applied at terminals 98 as a result of depression of keys on the keyboard. Shift register 96 is thus loaded with data from the key pad and counter 100 is reset to zero. Resetting the counter 100 to zero operates through an invertor 102 to enable a NAND gate 104 which is disabled by the load pulse. When the load pulse applied from the driver 94 terminates, the gate 104 is enabled and a "DATA ABAILABLE" signal is output from NAND gate 104 to NAND gate 76, which inhibits the output of VCO; and through invertor 106 to the input of shift register 78 and a flipflop 110. A receive clock signal is applied to the clock input of flipflop 110 and NAND gate 108. Flipflop 110 is conditioned by the "DATA AVAILABLE" signal from invertor 106 which is generated when the counter contains a count less than eight. At the positive transition of RCV CLK, flipflop 110 is clocked, storing the condition of "DATA AVAILABLE" and applying it to NAND gate 108. If data available is a logical 1, gate 108 is enabled and the $\overline{\text{RCV CLK}}$ is gated to the clock input of shift register 78.

Figure 15:
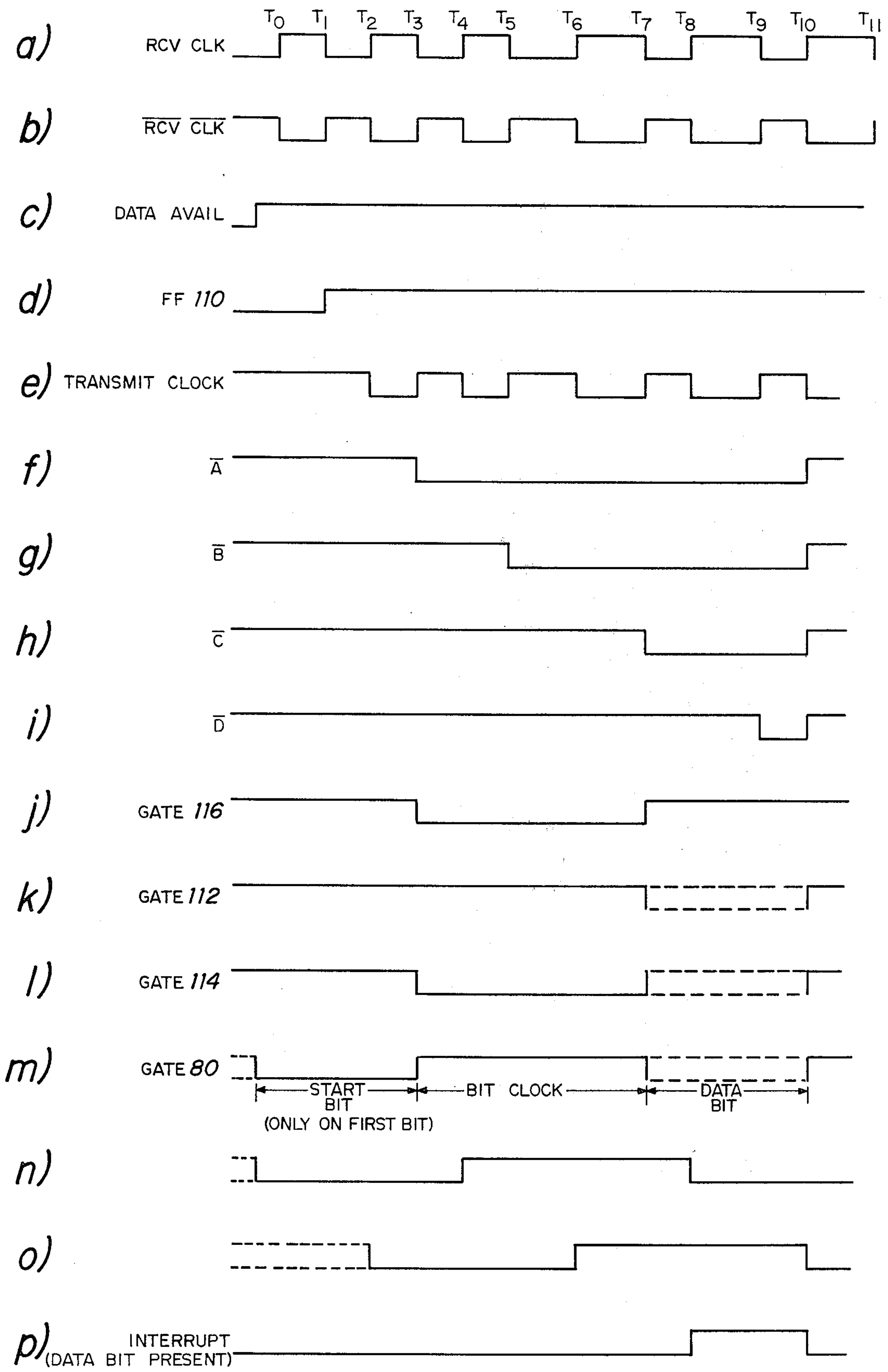
FIG. 15*a* – *p* illustrates timing signals for signals and gates illustrated in FIG. 3 and FIG. 5 and FIGS. 16*a–g* illustrate expanded portions of waveforms shown in FIG. 15.

Timing signals for data transmission and reception by the present system is shown in FIG. 15. Referring to FIGS. 3 and 15, at time $t_3$, shift register 78 is clocked and output "A" changes to a logical 1, enabling gate 116 and causing a logical 1 to be applied to the line driver which continues until time $t_7$, at which time output $\bar{C}$ of shift register becomes a logical 0 to disable gate 116. Simultaneously, the C output of shift register becomes a logical 1, enabling gate 112, which applies the output of shift register 96 to the line driver 82. At clock time $t_9$, output D of shift register 78 becomes a logical 1 enabling reset NAND gate 117; and output "D" becomes a logical zero. At clock time $t_{10}$, the RCV CLK input to NAND gate 117 becomes a logical "1" which causes the output of gate 117 to become a logical zero. This resets shift register 78, so that outputs "A, B, C & D" all again become logical zero. The transition of "$\bar{D}$" at shift register 96 and counter 100 causes the shift register to shift the next data bit in sequence to the input of NAND gate 112 and causes the counter to increment one count. If the counter does not increment to the count of eight, the above cycle repeats from $t_3$ to $t_{10}$. At the count of eight, xmit data available becomes a logical "0", which causes flipflop 110 at $t_{11}$ to clock to the reset state, disabling gate 108 which removes transmit clock from shift register 78. This also causes NAND gate 76 to become enabled, allowing the VCO 74 output to be applied through NOR gate 80 to the line driver.

Figure 16:
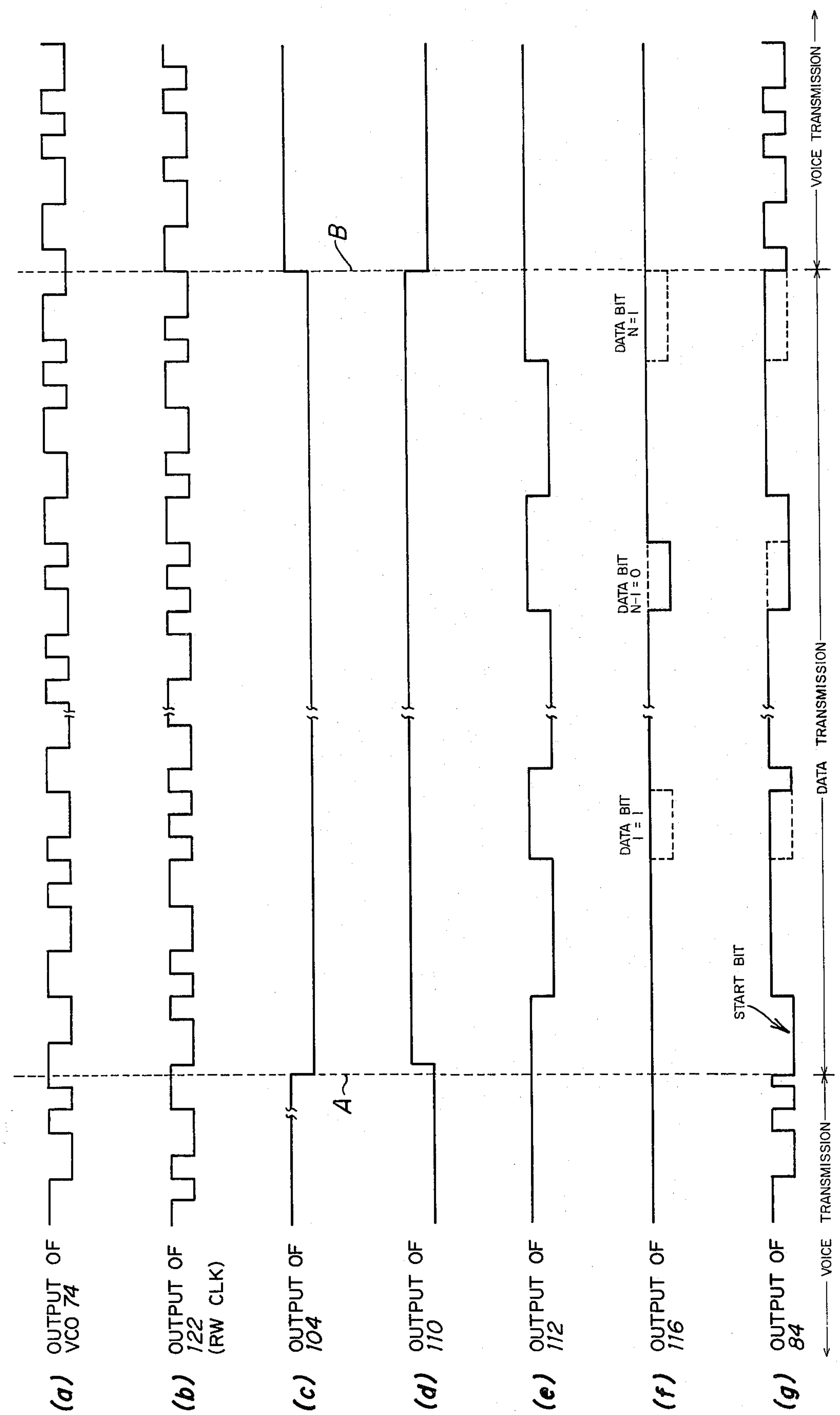

FIGS. 16*a–g* illustrates expanded portions of waveforms previously discussed in order to further illustrate the operation of FIG. 3. FIG. 16*a* illustrates the output of the VCO 74 shown in FIG. 3. FIG. 16*b* illustrates the output of NAND gate 122 (FIG. 4) which comprises the received data at the decoder and which is utilized as the raw clock for synchronizing data transmission in accordance with the invention. FIG. 16*c* illustrates the output of NAND gate 104 (FIG. 3), while FIG. 16*d* illustrates the output of the flipflop 110. The output of 104 marks a transition between voice transmission, data transmission and additional voice transmission, as shown by the dotted lines A and B. FIG. 16*e* comprises the output of NAND gate 112. FIG. 16f illustrates the output of NAND gate 116 which is applied, along with the output of gate 112, to the NOR gate 114. Data bits, which may be varied according to the data desired to be transmitted, are illustrated in FIG. 16*f* as being either logic ones or zeroes. FIG. 16*g* comprises the output of line driver 82 which is applied to line 84. FIG. 16*g* thus comprises the output of the transmitting circuitry shown in FIG. 3. FIG. 16 illustrates the transmission of voice data to the time denoted by line A, at which time digital data is transmitted for a time frame illustrated by the dotted line B. After the data frame, voice transmission is again transmitted. In this manner, voice and digital data may be transmitted over the same line.

Figure 4:
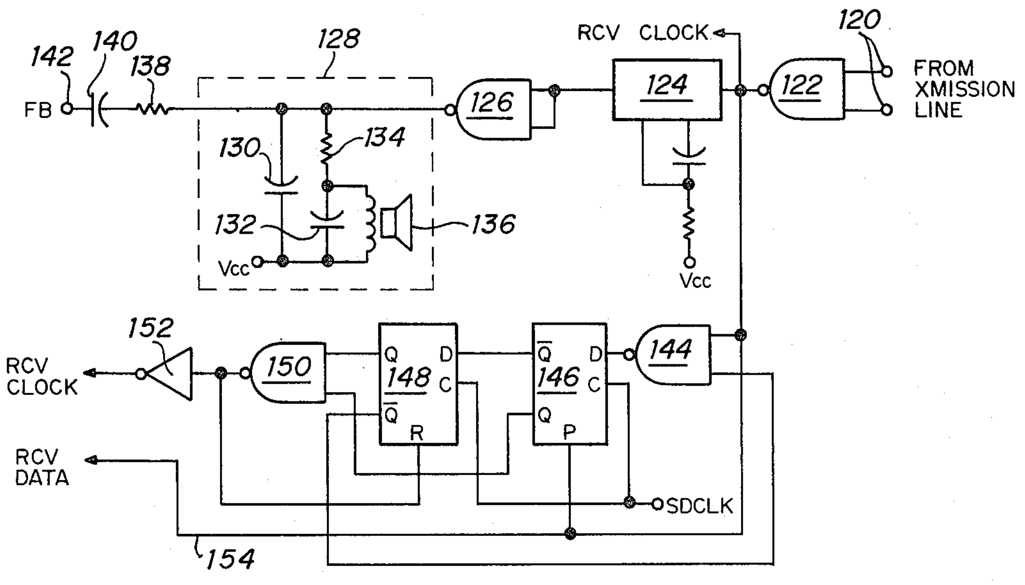
FIG. 4 is a schematic diagram of the decoder of the system.

FIG. 4 illustrates in schematic detail the decoder circuitry of the invention which receives the digitally coded data from an encoder at terminal 120 and passes the data through a line receiver 122 to a one shot multivibrator 124. Assuming voice transmission is received at terminal 120, each transition of the signal causes flipflop 124 to generate an output pulse which is applied to an open collector NAND gate 126. The output of gate 126 is applied to a low bandpass filter network 128 which serves to reconstruct the audio signal.

Network 128 includes parallel connected capacitors 130 and 132. A resistor 134 is connected between a terminal of capacitor 132 and the output of gate 126. A speaker 136 is connected across capacitor 132. An output to encoding circuits is applied to a terminal 142 through capacitor 140 and resistor 138. This output is utilized to provide conference call capability to the system.

In operation, gate 126 generates pulses which drop from a positive voltage to ground potential and back to positive potential. Capacitor 130 discharges through gate 126 to ground for a period corresponding to the pulse width of the one shot multivibrator 124. Thus, in effect, a portion of the charge is removed from capacitor 130 upon the generation of a pulse by the one shot multivibrator 124. Capacitor 130 charges from bias voltage Vcc through the speaker coil 136 and resistor 134 at a rate corresponding to a time constant determined by capacitor 130, resistor 134 and speaker coil 136. The voltage across capacitor 130 and the current through the coil 136 is determined by the relative periods of pulse widths and the time between the pulses from the gate 126. The pulse width is constant, but the time between the pulses is variable and is related to the frequency of the VCO shown in FIG. 3.

If data is transmitted to the terminal 120 from the transmission line, the data is applied through a NAND gate 144 to a pair of flipflops 146 and 148. The passage of the output from gate 122 is gated by the complimentary output of the flip-flop 148. The output of flipflop 148 is applied through a NAND gate 150 and an invertor 152 as the receive clock signal. The output from gate 122 is applied via lead 154 as the receive data. In the normal quiescent state, flipflops 146 and 148 are reset. During operation, flipflops 146 and 148 are clocked by the SDCLK output of the NOR gate 80 shown in FIG. 3.

The present system uses input data as the clock for data to be transmitted, so that a common clock is present at the telephone handset and at the central station with a suitable time delay. Flipflop 146 is clocked to reset if incoming data is high at "Send Clock Time." Receive data is sent to the input of flip-flop 146. If the incoming data goes low prior to the next "Send Clock Time," flipflop 146 is thus preset and no data is anticipated. If the incoming signal stays high for the next clock time, then flipflop 148 is clocked to the set position and flipflop 146 remains in the reset condition. When flipflop 148 is set and flipflop 146 is reset, the output of gate 150 is low which resets flipflop 148 and simultaneously delivers to invertor 152 a receive data clock signal. This signal indicates to the data receiving device that a data bit is present at the line receiver gate 122, such that the data may be suitably recorded.

Figure 5:
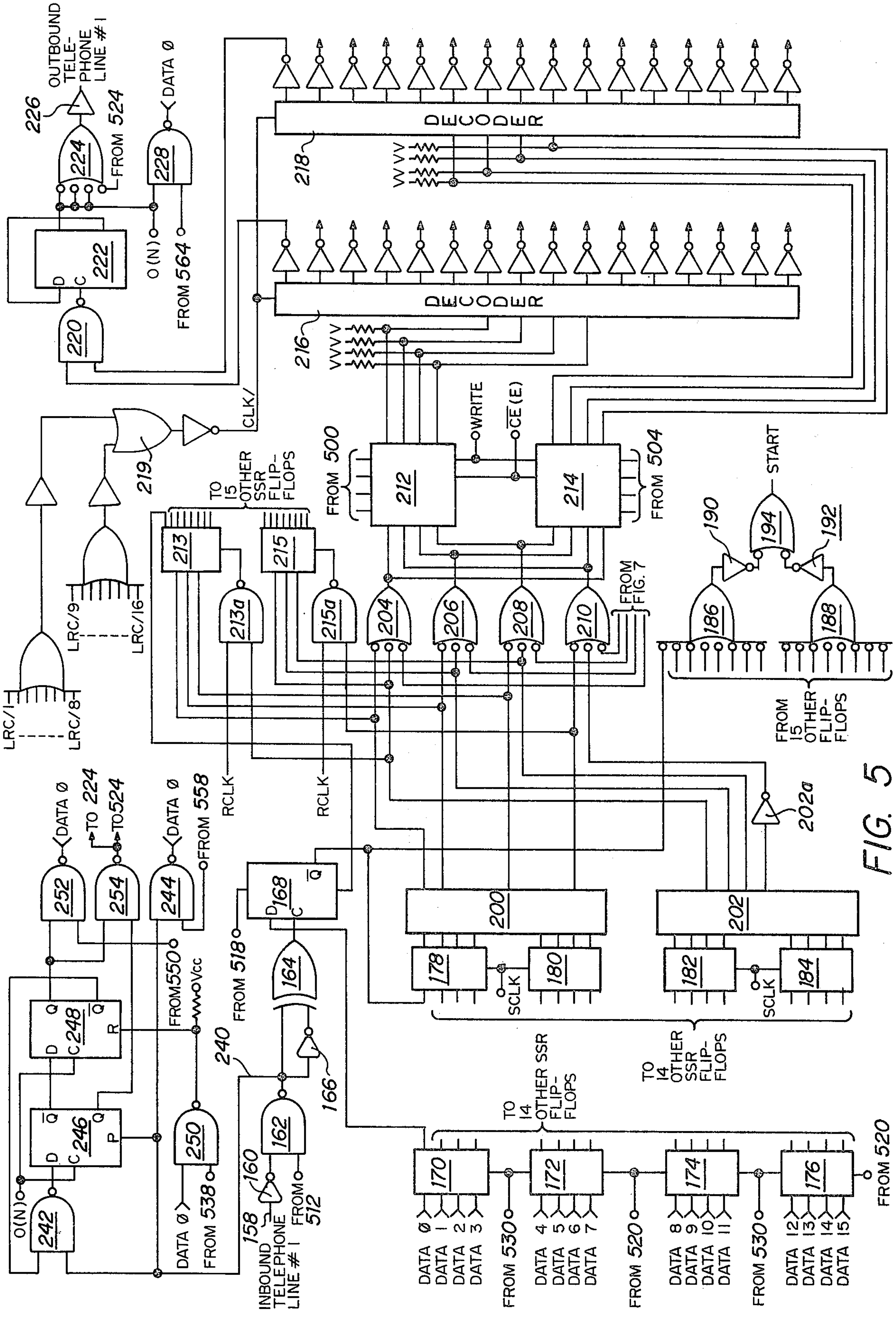
FIG. 5 is a schematic diagram of a portion of a switching station according to the invention.

FIG. 5 is a schematic diagram of a portion of the switching circuitry at the central station. Due to the large amount of circuitry involved in the entire system, only a single channel is illustrated in complete detail. The illustrated channel includes an inbound telephone line 158 which is applied through a line receiver 160 to an input of a NAND gate 162. It will be understood that 14 additional telephone line pairs are interconnected into this line service group, and that fifteen additional line service groups are included in the system as indicated in FIG. 2.

An important aspect of the invention is that pulse transitions of the digital data on telephone line 158 are detected and representations of the transitions are generated and passed to the desired outgoing telephone line. Thus, the present system is faster than previously developed switching systems which switch a full pulse, thereby tieing up the system for the duration of the pulse.

Referring again to FIG. 5, digital signals are applied from the local telephone line through a line receiver 160 to a NAND gate 162. The second input of gate 162 is gated by a strobe signal from logic circuitry to be later described. The output of gate 162 is applied directly to an input of an exclusive OR gate 164 and through an invertor 166 to the second input of gate 164. The output of gate 164 comprises a trigger corresponding to each positive or negative transition of the incoming signal via telephone line 158. The output of gate 164 is applied to a flipflop 168 which becomes set if enabled from an output from a quad flip-flop 170. Flipflop 170 comprises one of four quad flipflops 172–176, each receiving four inputs from the central processor. It should be noted that the complete system will include sixteen sets of fifteen identical flipflops 168 to correspond with the fifteen telephone lines applied to each line service group.

The output of the flipflop 168 is applied to an input of a quad latch 178 which comprises one of four identical quad latches 178–184. The quad latches 178–184 comprise four bit registers. When a high clock is applied to the latches 178–184, the signal is gated through the latches. When a low clock is applied, the latch stores the condition at the clock time. The remaining 15 inputs at the clock latches 178–184 are tied to the remaining 14 circuits corresponding to the other incoming telephone lines, and one of the inputs is connected to the central controller.

A Q output from flipflop 168 is also applied to one of 16 inputs of NOR gates 186 and 188. When any one of the 15 flipflops 168 are set, the outputs from gates 186 and 188 are applied through invertors 190 and 192 to an input of a NOR gate 194 in order to generate a start signal. The start signal is applied to the circuitry shown in FIG. 7, as will be subsequently described.

When one or more signals are applied from the flipflop 168 to the latches 178–184, the system clock becomes low and all of the inputs are stored in the latches 178–184. The outputs of the latches 178–184 are applied to two priority encoders 200 and 202. Priority encoders 200 and 202 comprise integrated circuits which generate outputs according to the highest priority input which is logic low. The encoders 200 and 202 each generate four outputs each having a different priority in order to provide priority control when a plurality of incoming calls are applied to the system. This is an important aspect of the present system, as due to this demand feature, time is allotted only to calls as is needed. Prior art systems generally have allocated fixed time intervals at fixed periods to each telephone line input, thereby requiring more complex circuitry to handle a specified number of incoming calls.

The output of the encoders 200 and 202 is applied to NOR gates 204–210. The encoder outputs are passed through gates 204–210 to 16 × 4 random access memories (RAMS) 212 and 214. These encoder outputs are the random access memory address. The contents of the address stored within the memories 212 and 214 are applied via eight outputs to decoders 216 and 218. Clocking signals are applied to decoders 216 and 218 from an OR gate 219.

Outputs of encoders 200 and 202 are also applied through NAND gates to the inputs of decoders 213 and 215. One output of decoder 213 is applied as a reset signal to the flipflop 168. The remaining outputs from the decoders 213 and 215 are applied to the fourteen other flipflops corresponding to flipflop 168 and connected to the remaining fourteen incoming telephone lines. The three other outputs from the encoders 200 and 202 are applied directly to the decoders 213 and 215. The outputs from the decoders are applied to reset the flipflops at the RCLK time, thereby removing the request for service.

The outputs from decoders 216 and 218 comprise sixteen outputs which are applied through 240 NAND gates 220. Only a single NAND gate 220 is illustrated for clarity of illustration. The output of each NAND gate 220 is applied through a flipflop 222 which applies an output through an NOR gate 224 and an invertor 226 to the outbound telephone line desired. Gating signals are applied to a NAND gate 228. The output from flipflop 222 comprises a representation of the incoming pulse transition applied to the input gate 164.

Digital data transmitted over the telephone line 158 is applied through lead 240 to inputs of NAND gates 242 and 244. The output of gate 242 is applied to a flipflop 246 which is interconnected to flipflop 248. Data and strobe signals are applied to the flipflops 246 and 248 via a NAND gate 250. The output of other flipflops 246 and 248 are applied to NAND gates 252 and 254. This circuitry interfaces between the incoming telephone line 158 and the central controller in order to enable data to be stored in the central controller. The system presents an interrupt signal via gate 254 to the controller. When the controller reads the data bit applied via gate 244, the controller resets the flipflop 248 in order to receive the next incoming data bit.

In operation of the system shown in FIG. 5, digital dialing signals are applied to the central controller from gate 244 and the address data of the desired outgoing telephone line is stored in memories 212 and 214 by the controller. A digital pulse transition which may comprise encoded analog data or binary digital data from a terminal or the like, is then applied via telephone line 158 and is detected by gate 164 to clock the flipflop 168. Flipflop 168 is set, as it is enabled by the quad flipflop 170 which is operated in response to a data bit from the central controller. The output of the flipflop 168 is applied into the quad latch 178 which either gates the data to the encoder 200 or stores the data until the encoder is clear. The encoder output data is applied through the NOR gates 204–210 to the RAMS 212 and 214. The stored address in the RAMS is accessed and the desired connection address is generated from decoders 216 and 218. The particular flipflop 222 which is designated by the connection address then generates a representation of the pulse transition applied to gate 164. The transition representation is then transmitted to the designated outgoing telephone line. This operation is repeated for each transition appearing on the incoming line.

It will thus be seen that a first level of multiplexing occurs at the quad latches 178–184, as any one of fifteen telephone inputs may be multiplexed and applied to the memory 212 and 214 in accordance with the hierarchy or demand features built into encoders 200 and 202. A second level of multiplexing occurs at the decoders 216 and 218, as the 16 groups may be switched between any of 240 outputs.

The central controller computer operates memories 212 and 214 in order to generate an 8 bit word which represents the address of the desired outbound telephone line for the incoming call. The 8 bit address is applied to the decoders 216 and 218 which then present an enabling signal to one of 240 possible output lines. For the particular output circuit chosen, the NAND gate 220 must receive two high inputs from the decoders 216 and 218. The resulting output of the gate 220 toggles the flipflop 222, the result of which is presented through line drivers to the telephone transmission line as a transition. The resulting transition applied to the output telephone line is generally identical to the input transition delayed by approximately 100 nanoseconds.

Referring to FIG. 15$m$, the signal appearing on the transmission line created by a one bit sequence previously described with respect to FIG. 3 comprises a start bit followed by a bit clock, followed by a data bit. The detector logic comprising flipflop 246 and flipflop 248, and NAND gates 242 and 254, is operated by the output of flipflop 222, which is the same signal, delayed by the transmission time, as the RCV CLK of FIG. 3. When flipflop 248 is reset, its $\bar{Q}$ output enables gate 242, which applies received data from NAND gate 162 to the data input of flipflop 246. The output of NAND gate 162 is also applied to the reset input of flipflop 246, which causes flipflop 246 to reset when received data becomes logical 0. A start bit is defined as a logical 1 level which persists for two positive transitions of the output of flipflop 222.

Referring again to FIG. 15, at time $t_2$, signal 15$m$ is a logical 0 which resets flipflop 246. At time $t_4$, flipflop 246 is clocked and its output Q becomes a logical 1, and 248 is clocked and its output becomes a logical 0. At time $t_6$, flipflop 246 is clocked and its $\bar{Q}$ output remains a logical 1; flipflop 248 is clocked and its output, $\bar{Q}$ becomes a logical 0, disabling gate 242. At time $t_8$, flipflop 246 is now clocked and its output Q becomes a logical 1. The Q output of flipflop 248 and the Q output of 246 enable gate 254, which signals to the controller that a data bit has been detected and is present at one input of NAND gate 244. The output of NAND gate 254 is also an input to NOR gate 224, which stops further transmission of data to the transmitting terminal. This inhibits the RCV CLK at the terminal, thereby stopping further data transmission until the controller acknowledges receipt of the data bit through NAND gate 250, resetting flipflop 248.

Figures 6, 7, 8, 14:
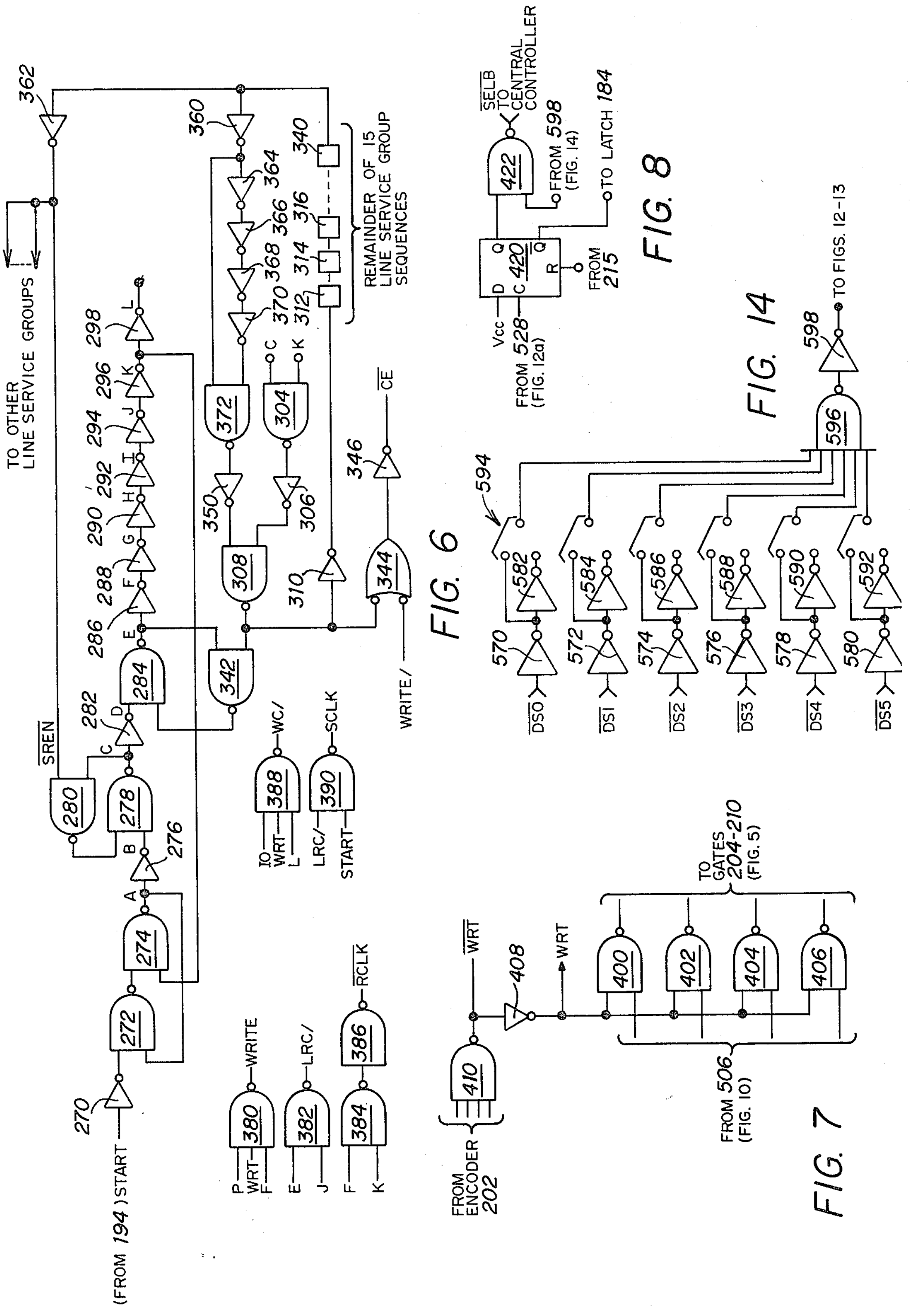
FIG. 6 is a schematic diagram of the timing and sequencer circuit of the switching station.
FIGS. 7 – 8 are schematic diagrams of portions of the logic circuitry of the invention.
FIG. 14 is a schematic diagram of the device address decoding and selection circuit of the invention.

FIG. 6 illustrates a schematic diagram of the sequencer circuit which provides the proper sequence of clocks and strobes for operation of the system shown in FIG. 5. After a start signal is applied from NOR gate 194 (FIG. 5) to invertor 270, the sequencer is initiated and a transition is initiated at the input of a NAND gate 272. The output of gate 272 is applied to an input of a NAND gate 274, the output of which is applied through an invertor 276 to an input of a NAND gate 278. The output of gate 278 is applied through a NAND gate 280, the output of which is connected to an input of gate 278. The output of gate 278 is also applied through an invertor 282 and through a NAND gate 284 to seven serially connected invertors 286–298. The outputs of gate 274, 278 and 284 and the outputs of invertors 276, 282, and 286–298 comprise clocking signals A-L which are illustrated in time in the timing sequence shown in FIG. 9.

In operation, initially output A from gate 274 is held high by gate 272. When start input to gate 270 goes high, output A goes low. All gates between gate 274 and invertor 298 then transition and the signal is applied via lead 300 back to an input of gate 274, invertor 276 and gate 278, and then terminates. The system is then at a pause state and the sequencer remains there until a clock $\overline{\text{SREN}}$ is applied as an input to gate 280. It will be understood that one sequencer of the type described above is provided for each of the 16 line service groups shown in FIG. 2. When the $\overline{\text{SREN}}$ is received, the transition is then applied from gate 278 and a transition is applied to the input of the gate 284. Gate 284 is enabled if gate 308 is enabled. Gate 308 is enabled if the output of invertor 350 is at a "one" state corresponding to a "Superior Line Service Group Not Busy" signal, and if gate 304 is enabled. If gate 308 is enabled a "Group Busy" signal is applied via an invertor 310 to the next sequencer circuit 312. It will be understood that 15 sequencers 312–340 identical to that shown in FIG. 6 are connected in series. It will thus be seen that the present sequencer system is a priority system, such that lower level priority groups may not respond when higher priority groups are occupying the system. The "Group Busy" signal applied to the sequencer 312 inhibits all lower levels of the system from responding to a call.

The output of gate 308 is applied through a gate 342 to an input of gate 284. NOR gate 344 generates a $\overline{\text{CE}}$ through an invertor 346 which enables the output of memories 212 and 214 of the selected line service group. The $D_0$ outputs of each of the sets of memories 212 and 214 are bussed together and only one group of memories 212–214 are enabled at one time.

When an input to gate 308 is applied from an invertor 350, the transition is allowed to continue past gate 284. During the continuance of the transition, a clock LRC/ is generated and is applied through NOR gate logic, not shown, to decoders 216 and 218 as clock signals. The clocks are thus routed from the circuitry shown in FIG. 6 to FIG. 5 to selected outputs of the decoders 216 and 218 and to gate 220. A plurality of taps, now shown, are connected to the various clock points A–L shown in FIG. 6 to generate appropriate clock signals which are applied to the circuitry shown in FIG. 5, such as to reset the quad latches 178–184 for the next line and the like.

When all of the groups have been satisfied for one clock time, the input to an invertor 360 becomes high, and an invertor 362 goes low to generate the $\overline{\text{SREN}}$ signal to the sequencers. A string of serially connected invertors 364–370 comprise a pulse generator which allows for settling of all the sequencers prior to testing of the line service groups for pending service request. The output of the pulse generator is applied through a NAND gate 372 which is connected through an invertor 350 to an input of gate 308.

Further referring to FIG. 6, a NAND gate 380 receives P, WRT and F input signals to generate the WRITE signal. NAND gate 382 receives E and J signals from the sequencer circuitry to generate the LRC/ clock signal. NAND gate 384 receives F and K signals and generates through NAND gate 386 the $\overline{RCLK}$ signal.

NAND gate 388 receives the IO, WRT and L signals to generate the WC/signal. NAND gate 390 receives the LRC/ and START signals and generates the SCLK signal.

FIG. 7 illustrates in schematic detail additional logic control circuitry of the invention. The controller applies control signals to the input of NAND gates 400–406. The remaining inputs of the gates 400–406 are connected through an invertor 408 to the output of a NAND gate 410. Gate 410 receives four outputs from the output of the encoder 202 shown in FIG. 5. The output of gates 400–406 are applied as inputs to NOR gates 204–210 shown in FIG. 5.

In operation, the controller applies signals to the gates 400–406 and gates 204–210 (FIG. 5) to condition the memories 212–214 to read or write. When it is desired to interconnect two telephone lines, the controller writes the line address into the memories 212–214 (FIG. 5). As an example, if it is desired to connect an input line 8 with a line 10, a binary 10 is written into line 8's address in the memories 212–214, (FIG. 5). To write in the line 8 position, the computer must present a binary 8 to the memories 212–214 at the outputs of gates 204–210. This binary 8 is supplied from gates 400–406 shown in FIG. 7.

The controller is assigned the lowest priority of the four latches 178–184 (FIG. 5) and is therefore connected to the last output of the latch 184. When the controller desires to write an address into the memories 212–214, a flipflop 420 shown in FIG. 8 is set by the controller. The $\overline{Q}$ output is connected to the last output of the latch 184. When the time for the input to latch 184 comes in priority, the input is awarded a cycle and the controller may write in the directed address. Gate 410 (FIG. 7) decodes the fact that the controller is requesting service and the gate 410 establishes the write mode by enabling gates 400–406 and enabling the write strobe gate, not shown. The data is then written into the memories 212–214. The Q output of the flipflop 420 shown in FIG. 8 is applied to a NAND gate 422 which generates a busy status to the controller until the controller's time and priority is provided by the latch 184 shown in FIG. 4.

Figure 9:
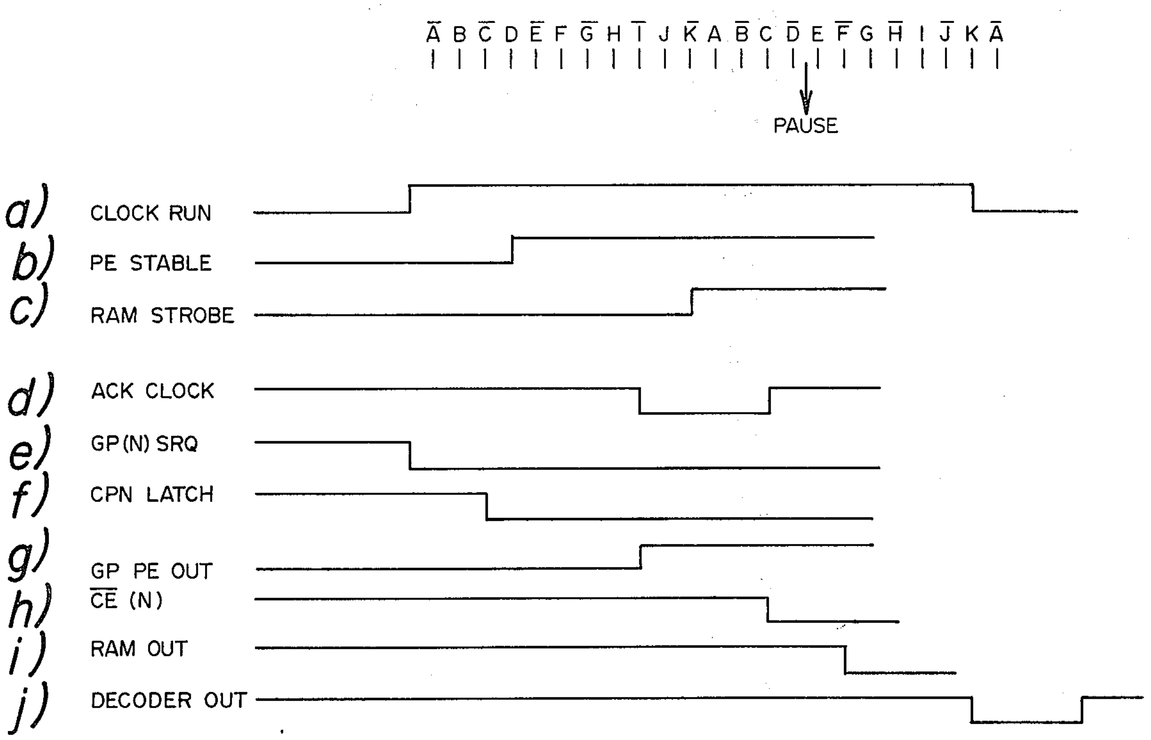
FIGS. 9*a* – *j* are waveforms illustrating various timing features of the switching system.

FIG. 9 illustrates timing diagrams for various functions of the system. For example, the duration of the CLOCK RUN signal extends during the time interval designated by the period $\overline{A}$–K defined by operation of the sequencer shown in FIG. 6.

Figure 10:
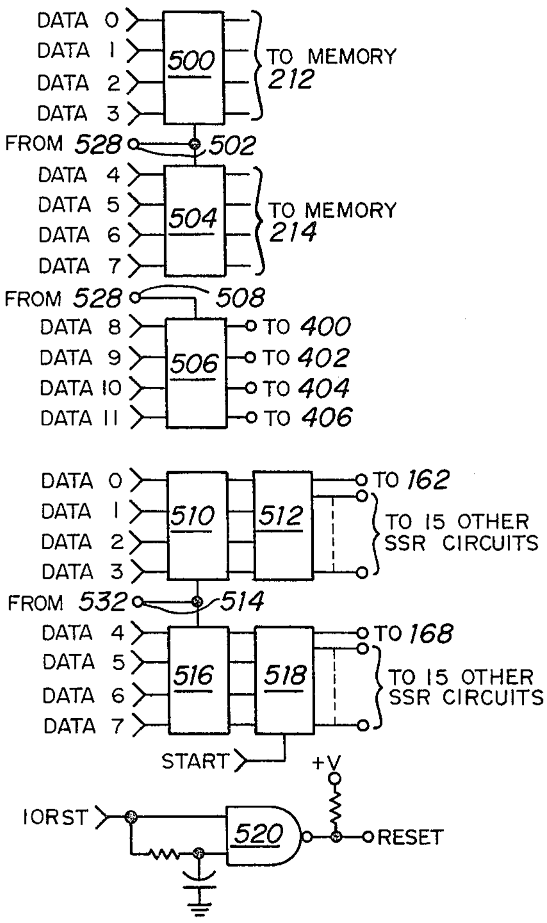
FIG. 10 is a schematic diagram of holding registers which interface between the sequence controller and the switching system of the invention.

Referring to FIG. 10, a plurality of holding registers are shown which serve to interface between the central controller and the telephone switching circuitry of the invention. A 4 bit register 500 receives four data bits DATA $\phi$ – 3 and may be gated by an output strobe signal applied to terminal 502. The output of the register 500 is applied to the memory 212 in FIG. 5. Similarly, data bits DATA 4 – 7 are applied to a 4 bit register 504 which is also gated by an output strobe applied to terminal 502. The output of the register 504 is applied to the memory 214 in FIG. 5. A 4 bit register 506 receives data bits DATA 8 – 11 from the central controller and is gated by output strobe signals applied to terminal 508. The output of the register 506 is applied to NAND gates 400–406 shown in FIG. 7.

Data bits DATA $\phi$ – 3 are also applied to the input of a 4 bit register 510, the outputs of which are applied to a decoder 512. Decoder 512 generates one of 15 outputs in accordance with the 4 bit binary code applied from the register 510. The first of the outputs of the decoder 512 is applied to an input of NAND gate 162 shown in FIG. 5. The remaining fourteen outputs of the decoder 512 are applied to 15 other service request circuits associated with the remaining inbound telephone lines of the line service group. An output strobe signal is applied to terminal 514 from the output strobe circuit to be subsequently described.

Data words DATA 4 – 7 are applied to a 4 bit register 516, the output of which is applied to a decoder 518. The first output of decoder 518 is applied to the present input of the service request flipflop 168 shown in FIG. 5 and the remaining outputs of the decoder 518 are applied to the other service request (SR) circuits. The Start signal is also applied by the controller to the decoder 518 to initiate test operation. The IORST signal is applied to an input of a NAND gate 520, which generates the reset signal for application to the circuitry of FIG. 5.

Figure 11:
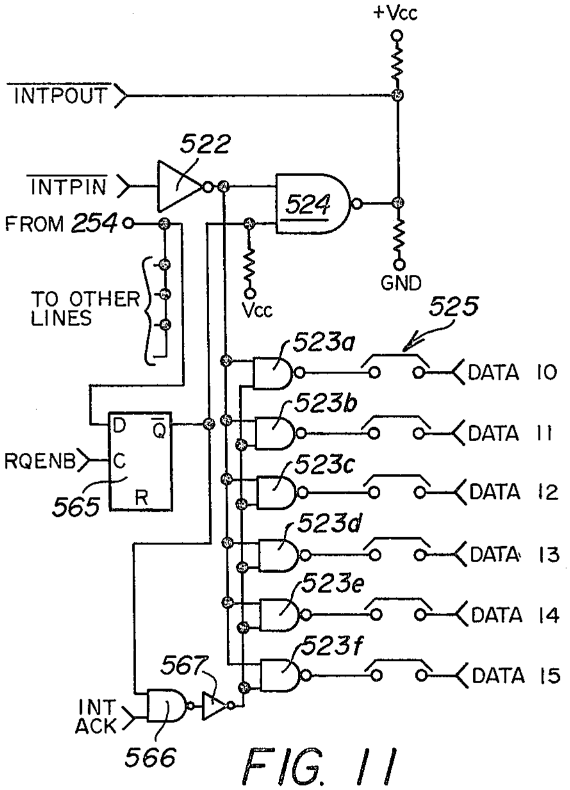
FIG. 11 is a schematic diagram of the interrupting device address circuit of the invention.

FIG. 11 illustrates the interrupting device address circuitry of the invention. The interrupt N signal $\overline{INTPIN}$ is applied through an invertor 522 to the input of a NAND gate 524. The output of gate 524 is applied as the interrupt out signal $\overline{INTPOUT}$ from the output of gate 524. The output of flipflop 565 (FIG. 5) is applied as a second input to the gate 524. Outputs from gate 254 and remaining telephone lines in the line service group are also applied to the input flipflop 565 to provide interrupt signaling.

The output of the invertor 522 is applied to a plurality of NAND gates 523*a* – *f*. The clock input to flipflop 565 is supplied by the controller. An output of flipflop 565 is also applied to NAND gate 566. The output of NAND gate 566 is inverted by invertor 567 and applied to the second inputs of NAND gates 523*a* – *f*. The output of NAND gates 523*a* – *f* are applied through address jumpers 525 to provide the data signals DATA 10 - DATA 15 which are applied to the data bus of the central controller.

Figure 12A:
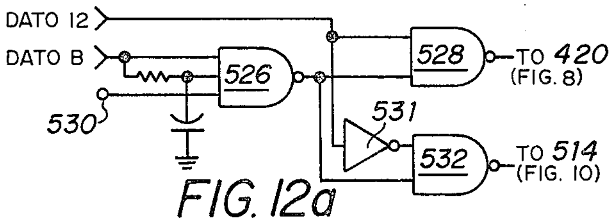
FIGS. 12*a* – *c* are schematic diagrams of output strobe circuits of the invention.
Figure 12B:
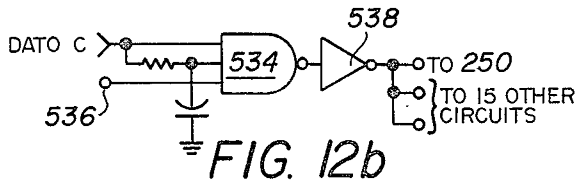
Figure 12C:
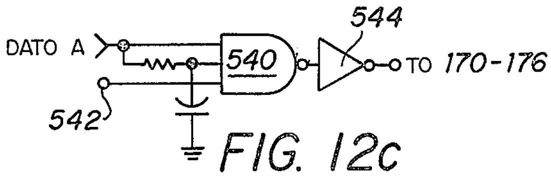

FIGS. 12*a* – *c* illustrate output strobe circuits. Data signals DATOB is applied to an input of a NAND gate 526, the output of which is applied to an input of a NAND gate 528. Terminal 530 is connected to receive the output of the device address decoding and selector circuit to be shown in FIG. 14. The output of gate 528 is applied to gate registers 500, 504, and 506 by application to terminals 502 and 508 as previously described.

The DATA 12 signal is applied through an invertor 531 to an input of a NAND gate 532. The output of gate 526 is also applied to an input of gate 532. The output of gate 532 is applied to gate registers 510 and 516 by application to terminal 514 as previously described.

Referring to FIG. 12*b*, the DATOC signal is applied as an input to a NAND gate 534. The output from the device address decoding and selector circuitry shown in FIG. 14 is applied to terminal 536 as an input to gate 534. The output of gate 534 is applied through an invertor 538 to generate a reset strobe signal to gate 250 shown in FIG. 5. Additional outputs from the invertor 538 are applied to the other logic gate circuits in the line service group.

FIG. 12*c* illustrates an output strobe circuit wherein the DATOA signal is applied as an input to a NAND gate 540. An output from the device address decoding and selector circuit shown in FIG. 14 is applied to terminals 542 as an input to gate 540. The output of gate 540 is applied through an invertor 544 to provide an output strobe output to flipflops 170–176 shown in FIG. 5.

Figure 13A:
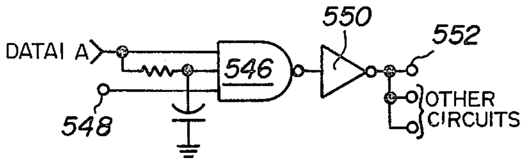
FIGS. 13*a* – *c* are schematic illustrations of the input strobe circuits of the invention.
Figure 13B:
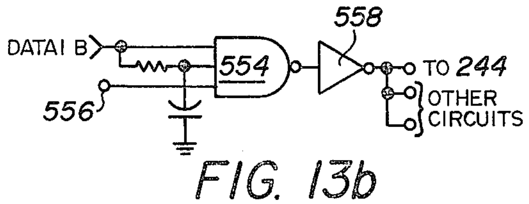
Figure 13C:
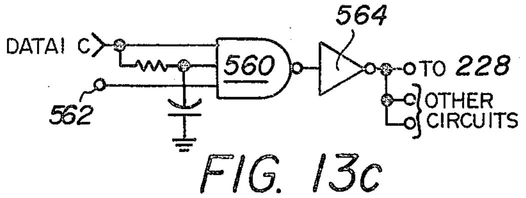

FIGS. 13*a – c* illustrate input strobe circuits. FIG. 13*a* illustrates a circuit wherein the input strobe signal DATIA from the central controller is applied as an input to a NAND gate 546. An output from the device address decoding and selector circuitry shown in FIG. 14 is applied to terminal 548. The output of gate 546 is applied through an invertor 550 to apply an input strobe via terminal 552 to gate 252 shown in FIG. 5. The remaining outputs from the invertor 550 are applied to the remaining logic circuits associated with the line service group.

FIG. 13*b* illustrates input strobe circuitry which receives the DATAIB signal which is applied to an input of a NAND gate 554. The output from the device address decoding and selector circuitry shown in FIG. 14 is applied as a second input to the gate 554 via terminal 556. The output of gate 554 is applied through an invertor 558 to generate an input strobe signal which is applied to an input of gate 244 shown in FIG. 5. The remaining outputs from the invertor 558 are applied to the other logic circuits in the line service group.

FIG. 13*c* illustrates an input strobe circuit wherein the DATAIC signal generated from the central controller is applied to an input of a NAND gate 560. The other input of the gate 560 receives the output of the device address decoding and selector circuit shown in FIG. 14 via terminal 562. The output of gate 560 is applied through an invertor 564 to gate 228 shown in FIG. 5. The input strobe signal is also applied to the other circuits in the line service group.

FIG. 14 illustrates the device address decoding and selector circuitry of the invention. Address signals $\overline{DS0}$ -$\overline{DS5}$ are applied through invertors 570–580, the outputs of which are applied to invertors 582–592. Address jumpers 594 are connected to the outputs of invertors 570–580 and 582–592 according to the predetermined address of the particular line service group involved. The address jumpers thus connect inputs to multi-input NAND gate 596, the output of which is applied through an invertor 598 as a line service group select signal. The select signal is applied to input and output strobe circuits shown in FIGS. 12 *a – c* and 13*a – c*.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A digital data switching system comprising:
- means for receiving a plurality of data lines;
- means common to each of said data lines and responsive to binary digital signals on any of said data lines for establishing a virtual data line connection; and
- means common to each of said data lines and responsive only to a pulse transition on a data line for transmitting a representation of said pulse transition to the virtually connected data line.

2. The system of claim 1 wherein said data lines comprise telephone lines and wherein said binary digital signals comprise dialing signals, and further comprising:
- means for storing address data contained in said dialing signals; and
- means responsive to said pulse transition for accessing said stored address data to establish a telephone line connection.

3. The system of claim 2 and further comprising:
- means for applying switching priority to incoming calls according to a predetermined hierarchy, such that switching is sequentially provided to various telephone lines according to the predetermined hierarchy.

4. The system of claim 2 wherein switching operation is provided to one of said telephone lines only when signals appear on said telephone lines.

5. A system for switching digital signals transmitted via data lines comprising:
- terminals connected to a plurality of incoming and outgoing data lines;
- accessing circuitry connected to said incoming data lines;
- memory means connected to said accessing circuitry;
- means responsive to digital data line address signals on one of said incoming data lines for storing address data in said memory means;
- means responsive to a pulse transition appearing on an incoming data line for activating said accessing circuitry to access said memory means and to cause said memory means to generate a digital address code representative of the desired outgoing data line;
- decoder circuitry connected to the output of said memory means and operable in response to said address code to generate a representation of said pulse transition; and
- means for transmitting said representation of said pulse transition to the desired outgoing data line.

6. The system of claim 5 wherein said memory means comprises a random access memory.

7. A telephone line digital switching system comprising:
- a plurality of normally disabled transition detector circuits each operable to receive digital data from a different telephone line;
- means responsive to dialing signals on any one of said telephone lines for storing address data and for enabling the transition detector circuit associated with the calling telephone line;
- said enabled transition detector circuit operable to change state upon receiving a pulse transition over the calling telephone line;
- means responsive to a change of state of said enabled transition detector circuit for utilizing said stored address data for generating a digital address code representative of the desired outgoing telephone line;

decoder means connected to the output of said memory means and operable in response to said address code to generate a representation of said pulse transition; and means for transmitting said representation of said pulse transition to the desired outgoing telephone line.

8. The switching system of claim 7 and further comprising:

a plurality of sequencer circuits each corresponding with a group of telephone lines and interconnected in a series chain;

said sequencer circuits generating timing signals when actuated in response to switching operations;

the sequencer circuits connected at the front of said series chain operable to be actuated prior to actuation of sequencer circuits connected at the rear portion of said series chain.

9. The switching system of claim 8 wherein the sequencer circuits connected behind an actuated sequencer circuit generate disable signals.

10. The switching system of claim 8 wherein each of said sequencer circuits comprises a series of inverter circuits.

11. The telephone switching system of claim 7 and further comprising:

means for enabling one of a plurality of transition detector circuits for operation according to predetermined selection criteria upon the occurrence of simultaneous transition detections at said detector circuits.

12. The telephone switching system of claim 7 wherein said telephone lines are arranged in a plurality of line service groups, and wherein said decoder means is common to all of said line service groups and includes line service group resolution logic and destination line decoding logic.

13. A system for transmitting analog signal information via telephone lines comprising:

means for converting said analog signal information into a series of pulses proportional to the magnitude of said analog signals;

means for transmitting dialing data and said series of pulses via a telephone line;

a central switching station connected to a plurality of telephone lines and operable to receive said dialing data;

a memory associated with switching station;

means responsive to said dialing data for storing address data in said memory;

decoder means responsive to the output of said memory for connecting a calling telephone line with a called telephone line for transmission of representations of transitions of said series of pulses; and means connected to said called telephone line for converting said representations of said transitions into representations of said analog signal information.

14. The system of claim 13 wherein said transmitting means comprises a voltage controlled oscillator.

15. The system of claim 13 wherein said means for converting comprises a first capacitor connector at one terminal to receive said pulses, a series connected resistor and a second capacitor connected across said first capacitor; and a speaker connected across said second capacitor for broadcasting said analog signal information.

16. The system of claim 13 and further comprising:

means for transmitting and receiving binary digital data through said calling and called telephone lines concurrently with transmission of said converted analog signal information.

17. A system for communicating analog and binary digital information comprising:

a multiplicity of terminals for receiving and sending information, said terminals each including means for converting analog amplitude signal information into analog pulse duration information signals;

means for combining said analog pulse duration information signals and binary digital data information signals into a pulse train for transmission;

transmission means for conveying said pulse train from said terminals;

means for receiving said pulse train;

means connected to said receiving means for discriminating and separating said pulse duration information signals and said binary digital data information signals from said pulse train;

switching means responsive to the information conveyed within signals for directing said information from one terminal to one or more of said terminals; and means at each of said terminals for reconstruction of said analog amplitude information signal from said pulse duration information signal.

18. The system of claim 17 wherein said converting means comprises:

a voltage controlled oscillator.

19. The system of claim 17 wherein said combining means comprises:

means for detection of the presence of said binary digital data presented for transmission via said transmission means;

means for interruption of the conveyance of said analog pulse duration information signal to said transmission means;

means for applying said binary digital data to said transmission means;

means for synchronizing transmission of said binary digital data to receiving terminal means;

means for detection of completion of transmission of said binary digital data information to transmission means; and means for restoration of transmission of said analog pulse duration information signal.

20. The terminal system of claim 19 wherein said discriminating and separating means comprises:

means for synchronizing said transmitting terminal means;

means for detecting the presence of said binary digital information signal from said transmission means; and means for signaling the presence of a valid binary digital information signal bit present on the transmission means.

21. The system of claim 17 wherein said reconstruction means comprises:

means for generating a constant width and constant amplitude pulse for each transition of said pulse train; and means for connecting said constant width and constant amplitude pulses into an analog voltage signal proportional to the repetition rate of said constant width and constant amplitude pulses.

22. The system of claim 17 wherein said reconstructing means comprises:

a one-shot multivibrator;

a final capacitor connected at one terminal to said one-shot multivibrator to receive said pulses;

a series connected resistor and second capacitor connected across said first capacitor; and speaker means connected across said capacitor for transducing said analog amplitude information signal.

23. The system of claim 17 wherein said transmission means comprises a multiplicity of telephone lines each terminating at one end at said switching means and each terminating at its other end at one of said terminals.

24. The system of claim 23 wherein said switching means comprises:

means for interpreting and processing said binary digital data information;

means for routing said pulse train received from said receiving means to a corresponding one of a multiplicity of a transmitting means each connected to one of a multiplicity of said telephone lines; and means for transmitting said routed pulse train to said telephone lines and to said terminal means terminating thereon.

25. The system of claim 24 wherein said receiving means comprises a line receiver.

26. The system of claim 17 wherein said pulse discriminating and separating means comprises:

means for synchronizing to said transmission means, means for detecting the presence of said binary digital information from said receiving means;

means for detecting the presence of a valid binary digital information signal from said receiving means; and means for signaling the presence of a valid binary digital information signal bit present at the receiving means.

27. The system of claim 26 wherein said synchronizing means comprises:

means for utilizing said pulse train transmitted to a terminal for deriving a transmit clock.

28. The system of claim 26 wherein said detecting means comprises:

a gate, and a pair of multivibrators connected in series with said gate.

29. In a system for transmitting analog and digital signal information via telephone lines, the combination comprising:

a voltage controlled oscillator for converting said analog signals into digital pulses having time durations proportional to the amplitude of said analog signals, means for generating binary digital data, means for combining said binary digital data with said digital pulses, means for transmitting said combined digital pulses and said binary digital data over said telephone line, means at a remote station for receiving said digital pulses and said binary digital data, means for separating said received digital pulses and said binary digital data, low bandpass filter means for reconstructing said analog signal information from said digital pulses, speaker means connected across said filter means for broadcasting said analog signal information, and means for directing said binary digital data to a selected remote terminal.

30. The combination of claim 29 wherein said means for generating said binary digital data comprises:

a load shift register for receiving binary digital data from a terminal source, counter means, and a clocking register for clocking said digital data from said shift register for a period determined by said counter.

31. The combination of claim 29 wherein said low bandpass filter means comprises a first capacitor connected at one terminal to said receiving means to receive said pulses, and a series connected resistor and second capacitor connected across said first capacitor.

* * * * *